(12) United States Patent
McElroy

(10) Patent No.: US 8,075,033 B1
(45) Date of Patent: Dec. 13, 2011

(54) DUAL LOADING STOCK TRAILER

(76) Inventor: John McElroy, Snyder, OK (US)

( * ) Notice: Subject to any disclaimer, the term of this patent is extended or adjusted under 35 U.S.C. 154(b) by 0 days.

(21) Appl. No.: 12/807,797

(22) Filed: Sep. 14, 2010

Related U.S. Application Data

(60) Provisional application No. 61/276,877, filed on Sep. 17, 2009.

(51) Int. Cl.
*B60P 3/04* (2006.01)
(52) U.S. Cl. ............... 296/24.31; 296/182.1; 296/184.1; 119/406; 119/414
(58) Field of Classification Search ............... 296/24.31, 296/184.1, 182.1, 37.1, 26.01, 26.06, 26.07; 193/5; 119/406, 407, 400, 414; 14/71.5; 414/537
See application file for complete search history.

(56) References Cited

U.S. PATENT DOCUMENTS

| | | | |
|---|---|---|---|
| 2,822,940 A | | 2/1958 | Kopaska |
| 3,020,083 A | * | 2/1962 | Doan et al. ............... 296/24.31 |
| 3,292,967 A | * | 12/1966 | Peek ........................ 296/24.31 |
| 3,442,550 A | | 5/1969 | Esbeck |
| 3,674,303 A | * | 7/1972 | Doonan et al. ............. 296/24.31 |
| 4,153,289 A | * | 5/1979 | Lewis et al. ............... 296/24.31 |
| 4,293,158 A | * | 10/1981 | Lewis et al. ............... 296/24.31 |
| 4,439,087 A | | 3/1984 | Schink |
| 6,439,825 B1 | | 8/2002 | Bonsall |
| 6,527,326 B2 | | 3/2003 | Henderson |
| 7,152,726 B2 | | 12/2006 | Stotts |
| 2002/0102153 A1 | * | 8/2002 | McElroy ..................... 414/537 |
| 2003/0053900 A1 | * | 3/2003 | Neville ....................... 414/537 |

* cited by examiner

*Primary Examiner* — Glenn Dayoan
*Assistant Examiner* — Gregory Blankenship
(74) *Attorney, Agent, or Firm* — Randal D. Homburg

(57) ABSTRACT

A livestock trailer providing a dual level livestock loading entrance with a first loading area at a level for loading and unloading livestock or other animals at a dock height and a built-in chute within a second loading area at a level for ground loading and unloading livestock at or near ground level, the trailer further providing a combination interior wall and floor panel with a central rotating mechanism providing either an interior wall separating the first and second loading areas or lying securely flat over the recessed floor in the second ground loading area to prevent access to the recessed floor of the ground loading area during loading and unloading in the first loading area and also providing a ramp in the recessed floor of the second loading area, the ramp being adjustable at a front end to be raised or lowered, the raised position utilized during the loading and unloading operation forming a ramp between the principle trailer floor and the recessed floor of the second loading area, and a lowered position during transport for an additional livestock, animals or other related item storage area.

12 Claims, 5 Drawing Sheets

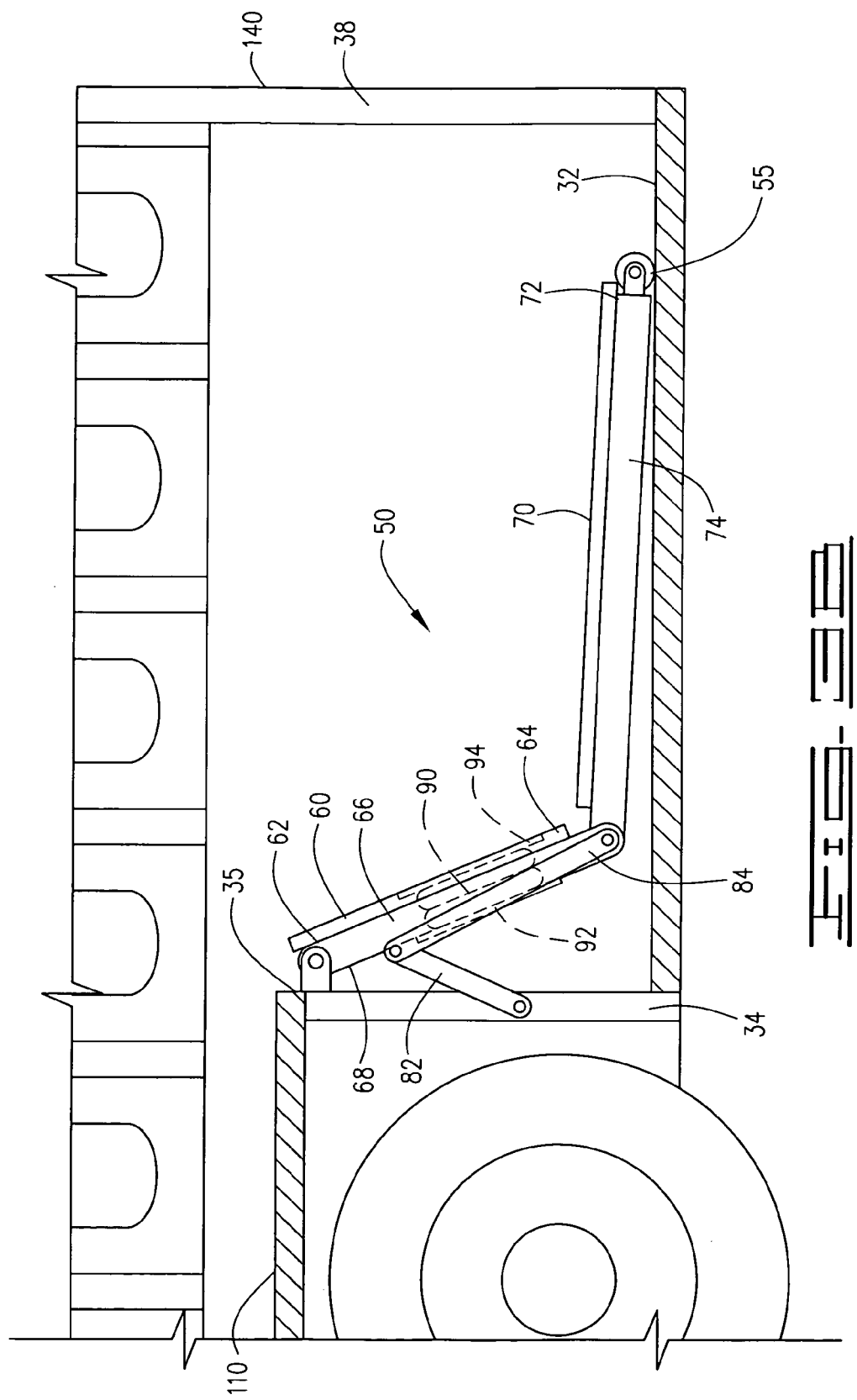

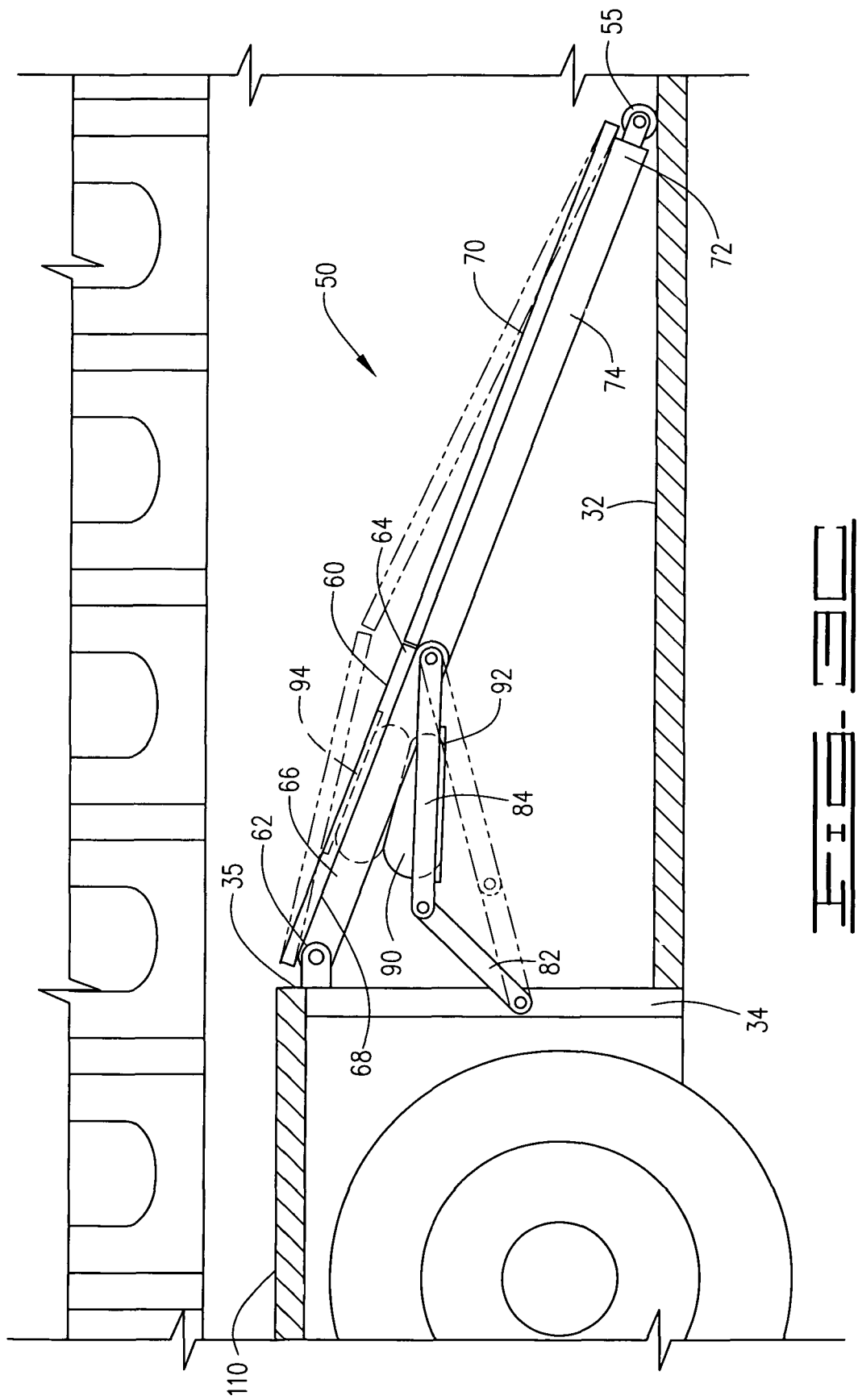

DUAL LOADING STOCK TRAILER

CROSS REFERENCE TO RELATED APPLICATIONS

Applicant claim the benefit of U.S. Provisional Patent Application No. 61/276,877, filed on Sep. 17, 2009, by the same inventor.

BACKGROUND OF INVENTION

1. Field of the Invention

A livestock trailer providing a dual level livestock loading entrance with a first loading area at a level for loading and unloading livestock or other animals at a dock height and a built-in chute within a second loading area at a level for ground loading and unloading livestock at or near ground level, the trailer further providing a ramp in the recessed floor of the second loading area, the ramp being adjustable at a front end to be extended as a ramp during loading or unloading or collapsed into a relatively compact vertical position providing for additional storage in the second loading area whether extended or collapsed, the extended position forming a transitional ramp between the principle trailer floor and the recessed floor of the second loading area.

2. Description of Prior Art

A preliminary review of prior art patents was conducted by the applicant which reveal prior art patents in a similar field or having similar use. However, the prior art inventions do not disclose the same or similar elements as the present dual loading entrances or the retractable ramp located in the recessed floor of the second loading area, nor do they present the material components in a manner contemplated or anticipated in the prior art.

Extendable end ramps for unloading trailers and livestock transport vehicles indicate uses for loading and unloading livestock and to provide a transition from the elevated floor of the trailer deck to the ground. These devices either raise and lower from a horizontal transport position to the ground, as found in U.S. Pat. No. 2,822,940 to Kopaska, and more recently in U.S. Pat. No. 7,152,726 to Stotts, or pivot from an upright transport position to a lowered ramp position, as found in U.S. Pat. No. 6,439,825 and U.S. Pat. No. 3,442,550 to Esbeck. Yet other slide into a compartment below the bed of the truck, as in U.S. Pat. No. 4,439,087 to Schink and is also readily found in most rental moving vans.

As to livestock trailers, these are most commonly observe as depicted in the Stotts patent, for use in stock pen loading, where livestock trailers are back up to a loading ramp from a corral or pen, walked up a stationary ramp, and loaded into the trailer for transport. Stotts identifies his disclosed subject matter as a ramp which extends from the rear of the stock loading livestock trailer and allows the livestock to unloaded from the extended ramp which is attached to the rear of the trailer, but not made an integral part of the trailer.

The present dual loading stock trailer provides a livestock trailer with two integrated fixed rear end sections, one identified as a first loading area to load and unload livestock from a stock pin ramp, and a second loading area for ground loading of livestock. The ramp loaded trailers are called "pot load trailers" in the Stotts patent (Column 1, lines 13 to 23). These trailers commonly have a deck height of approximately 48 inches from the ground. The ground loading type trailers provide a means to load cattle into a livestock trailer from the ground, having a deck height of between 12 and 19 inches. These ground loading trailers are identified and referenced within the Stotts patent under "Other Publications" on the abstract page as the "McElroy Groundload Livestock Trailers", date unknown, internet download 2003, manufactured and sold by this present inventor, John McElroy, several years ago.

The second loading area of the dual loading stock trailer also provides an internal extendable ramp, which provides a compacted stored position in which the ramp folds into a vertical section and horizontal section and an extended ramp position in which the vertical section and horizontal section are extended into a transitional platform, giving livestock a means to travel from the deck height of the trailer to the ground level loading height. The means to collapse and extend the ramp may be provided by hydraulics, compressed air or a mechanical means.

SUMMARY OF THE INVENTION

Stock trailers, especially those which are semi-trailer sized livestock transport trailers, have been provided in two general embodiments—either as a ground level loading trailer, commonly seen in small stock trailers and ground loading livestock semi-trailers, where the lowermost rear portion of the ground loading trailer is either at a fixed height, or has the ability to drop a few inches when suspension air is released, lowering the back end of the trailer. These ground loading floors are from 12 to 19 inches off the ground. These are used where there is no dock loading or unloading, or a ramped stock chute for loading and unloading the livestock. The other commonly supplied livestock trailer provides the floor of the livestock trailer at a fixed dock height, usually more than four feet off the ground. Livestock being unloaded or loaded are required to either walk up a ramp to get into the livestock trailer or require loading from an elevated dock. If a rancher has only one of these trailers, he is going to have to conduct his loading or unloading at locations which accommodate the rear height of the trailer or rely on someone having a portable ramp on site to assist in the livestock loading or unloading from the trailer. This is also applied to trailers having use in the transport of exotic animals, domesticated and non-domesticated animals and zoo animals.

The present dual loading trailer provides both a ground loading and a dock loading rear end. In providing such dual loading rear end having a first entrance at dock height and a second entrance at ground loading height, the operator may load and unload livestock either with or without a dock or elevated livestock ramp. This also facilitates the dual loading livestock trailer to load and one height and unload at another or the reverse. A panel should be located between the first loading section and the second loading section to prevent livestock from falling into the lower second loading section from the first elevated loading section and to segregate the two compartments from one another.

In addition, the dual loading livestock trailer provides the second entrance with a recessed floor area, commonly referred to in the art as the "jail area" and provides the recessed floor of the jail area with a collapsible ramp which may be extended from a first collapsed position to an extended second position providing the livestock with a means to walk from the elevated deck floor of the livestock trailer to the ground or the reverse. Further, when the ramp is in a collapsed position, a lower section of the ramp rests upon the recessed floor, making additional transport floor space available for more livestock. The means to extend and collapse the ramp should be of sufficient strength to be raised and lowered when livestock are upon the ramp. A swinging gate may also be provided when the ramp is in a collapsed position to prevent livestock from falling into the second loading section during transport or while loading using the upper loading entrance.

DESCRIPTION OF THE DRAWINGS

The following drawings are formal drawings submitted with this non-provisional patent application.

FIG. 3B is a same side view as FIG. 3A showing the retractable ramp in a partially extended position wherein the lifting means is an airbag.

FIG. 3C is a side view showing the retractable ramp in fully extended positions, an overextended position shown in phantom lines, from the lower floor of the second loading area to the deck of the trailer, wherein the lifting means is an airbag.

DESCRIPTION OF THE PREFERRED EMBODIMENT

Figure 3A:
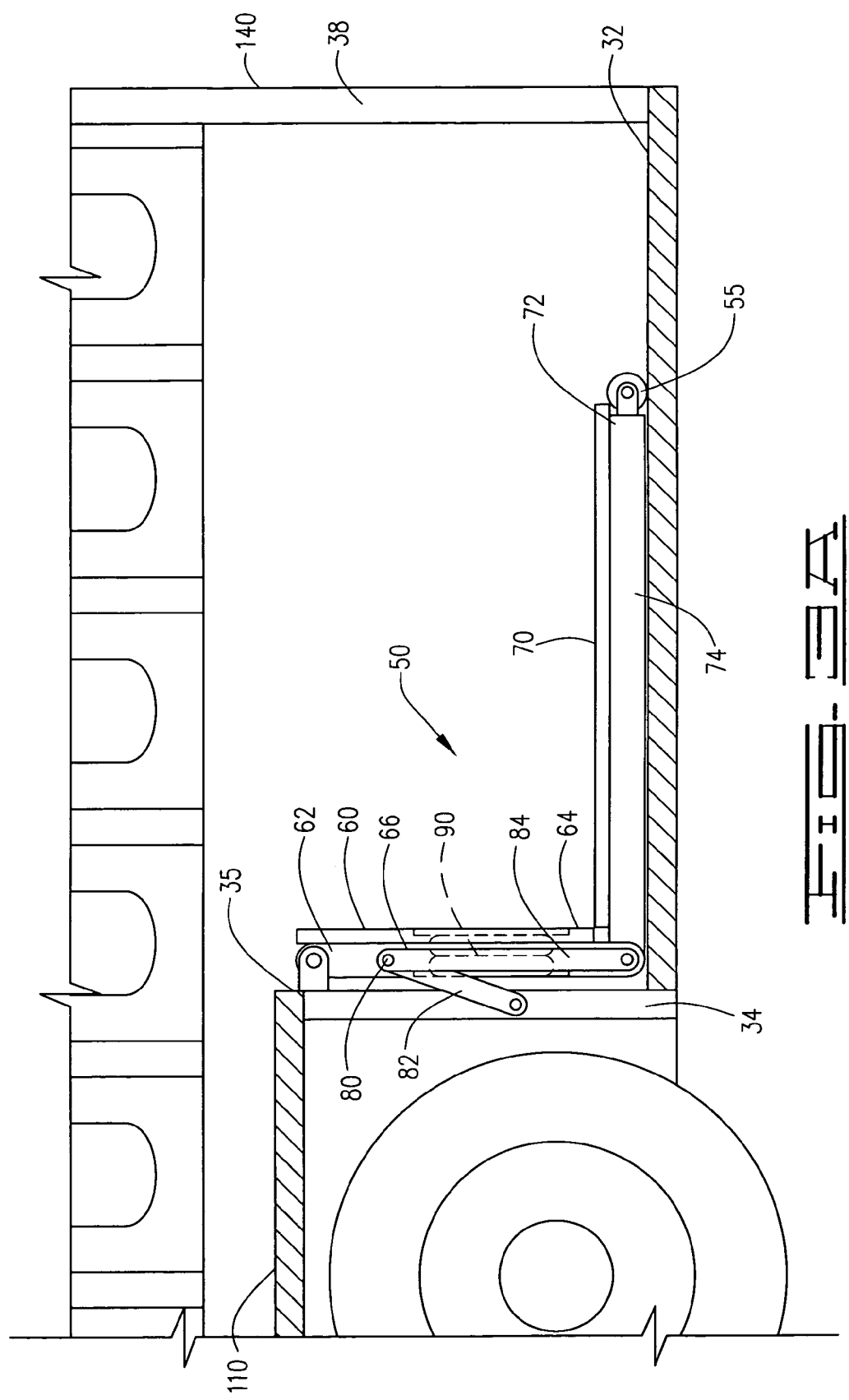
FIG. 3A is a side view of the retractable ramp in a collapsed position wherein the ramp lifting means is an airbag.

An improvement to livestock trailers, as indicated in FIGS. 1-3C of the drawings, provides an enclosed livestock trailer 100 defining a deck floor 110, sides 120, a front end 130, a rear end 140 and a roof 150, the improved livestock trailer further defining a first loading area 20 at the rear end of the trailer having a loading floor 22 even with the deck floor of the livestock trailer and positioned at a height of a conventional fixed loading dock at a stockyard or corral, for unloading livestock or other animals at a loading dock level, a second loading area 30 adjacent to the first loading area 20 at the rear end 140 of the trailer, the second loading area 30 having a recessed floor 32 and positioned at a height, preferably between twelve and eighteen inches from the ground, for unloading livestock directly onto the ground behind the livestock trailer and a collapsible ramp 50 within the recessed floor 32 of the second loading area 30, the ramp 50 defining a lifting means 90, extended from a collapsed position, FIG. 3A, into an extended position, FIG. 3C, utilized during the livestock loading and unloading operation, forming a solid transitional platform between the deck floor 110 of the trailer and the recessed floor 32 of the second loading area 30, the collapsed position of the ramp chosen during transport for an additional livestock pen or an equipment and feed storage area. It is irrelevant as the orientation at the rear end of the trailer as to the first and second loading areas. The drawings merely represent the presence of the first and second loading areas, which may be reversed depending upon the preference of the trailer manufacturer.

The lifting means 90 in FIGS. 3A-3C are representations of a single embodiment of the collapsible ramp and lifting means, the lifting means 90 provided as an airbag. The lifting means 90 could also be a mechanical means, including a chain drive, cable drive, screw drive, or hydraulic lift, or could utilized the on board air compression already included in the trailer, as indicated using an air bag, or may be provided as an electrical motor driven lift. The drawings are not intended to limit the lift means but only to indicate one possible embodiment.

The collapsible ramp 50, shown in a first embodiment in FIGS. 3A-3C, is further defined as having an upper section 60 and a lower section 70. The second loading area 30 is defined by the recessed floor 32, a front vertical panel 34 and two vertical side panels 36, as well as the second loading area doorway 38 having a vertical sliding door 37 or swinging closure to close off the doorway. In FIGS. 3A-3C, an upper edge 62 of the upper section 60 of the ramp is pivotally connected to an upper margin 35 of the front vertical panel 34, suspending the upper section 60 of the collapsible ramp, as indicated, with the lower section 70 of the ramp resting relatively flat upon the recessed floor 32 of the second loading area in the collapsed position.

The lower edge 72 of the lower section 70 includes at least one roller 55 or skid to roll or slide this lower edge 72 along the recessed floor 32 during the extension of the ramp 50 from the collapsed position to the extended position and the reverse. It might be suitable for the roller 55 to be provided in a track within or upon the recessed floor, though not shown in the drawings. The upper section 60 further provides an upper section side support rail 66 on each side of the upper section 60, pivotally attached to lower section side support rails 74 on each side of the lower section 70 and a secondary ramp support brace assembly 80 defining a pair of first brace sections 82 pivotally attached to the front vertical panel 34 below the upper edge 62 of the upper section 60 of the ramp 50, and a pair of second brace sections 84 pivotally attached between the first brace sections 82 and the lower edge 64 of the upper section 60 of the ramp 50 on a lower surface 68 of the upper section 60. The lifting means 90 is attached between a base lifting means support 92 attached to the second brace sections 84 and a cap lifting means support 94 attached to the lower surface 68 of the upper section 60 of the ramp 50. When deployed, the lifting means 90 creates a force urging the base lifting means support 92 away from the cap lifting means support 94, also forcing apart the second brace sections 84 from the upper section 60 of the ramp 50, as shown in FIG. 3B. When the lifting means is fully deployed, the ramp 50 is in its extended position, FIG. 3C, which includes a flat transitional platform, shown in solid lines or an over-extended transitional platform as indicated by the phantom lines. When the lifting means 90 is fully collapsed, the ramp 50 is in its collapsed position, FIG. 3A.

In a second embodiment, the collapsible ramp 50 may be provided with the upper edge 62 of the upper section 60 may be attached directly to a presenting margin of the deck floor 110 by a hinge, not shown, which would eliminate the need for the front vertical panel 34 of the second loading area 30 and also allow access to the lifting means 90 from the wheel well of the trailer for maintenance and repair.

The second loading area 30 as defined by the vertical side panels 36, the recessed floor 32 and the front vertical panel 34 and/or the collapsible ramp 50 when retracted, may be referenced as the "jail area". It is preferred that the collapsible ramp 50, when in the extended position, is not completely back to the doorway 38, FIG. 3C, and that there is some distance of up to at least 18 inches between the lower edge 72 of the lower section 70 and the doorway 38. This provides a portion of exposed flat portion upon the recessed floor 32 within the "jail area" to use for during transport and to allow the "jail area" to actually be used for livestock or animal transport. However, in this regard it should be noted that the collapsible ramp 50, when fully extended, must be of sufficient strength to hold live animals during transport and the lifting means 90 should also be of sufficient lift capacity to extend the collapsible ramp 50 with animals upon the collapsible ramp 50 throughout its extension. The collapsible ramp 50 may also include a chain limiter attached between either the side support rails 66 of the upper section 60 and/or the side support rails 74 of the lower section 70 and the recessed floor 32 or vertical side panels 36 of the second loading area 30 to limit and control the amount of extension of the collapsible ramp 50, depending upon the type of lifting means 90 used. The second loading area, when defined by essentially the recessed floor, side panels, doorway and the collapsible ramp, should at a minimum support a load in the second loading area, whether the load includes livestock, animals, feed, tack equipment or other transported materials or a combination, and whether the collapsible ramp is in an extended or retracted position, and also regardless of whether the livestock trailer is stationary or in transit. The collapsible ramp 50 may also be integrated as part of the recessed floor, or integrated with the side panels and doorway as a vertical retaining component, or both.

Figure 1:
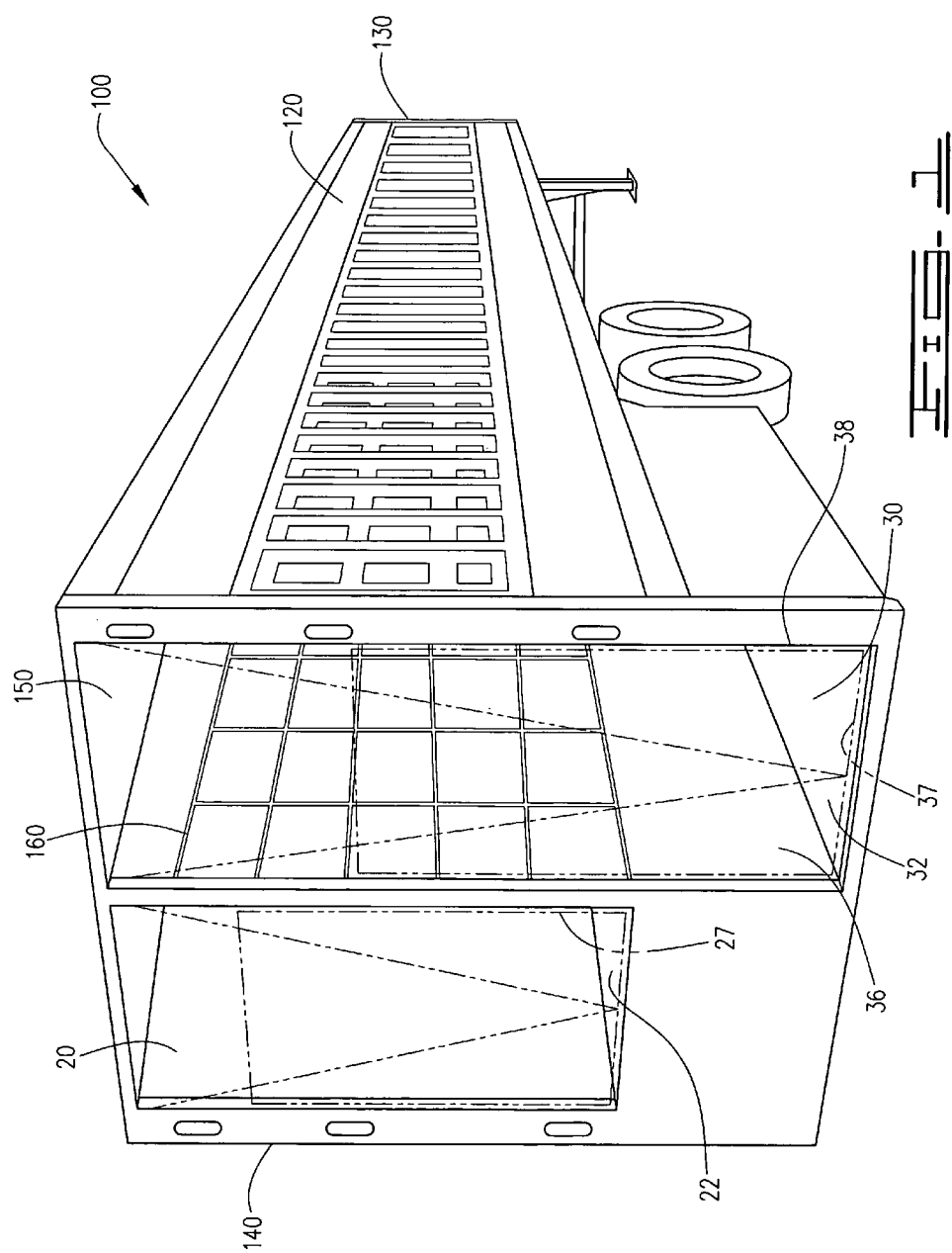
FIG. 1 is a rear perspective view of the dual loading stock trailer.
Figure 2:
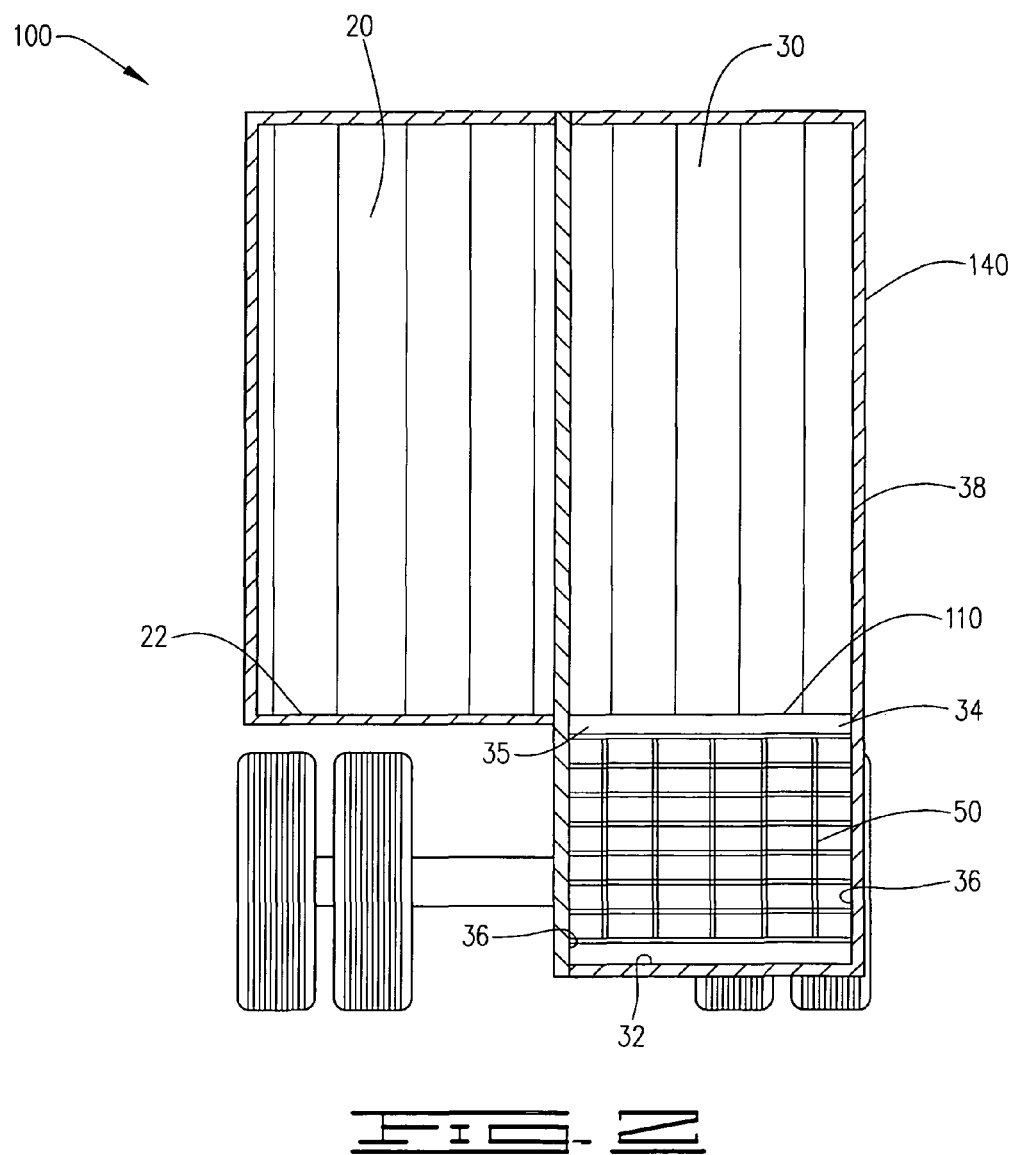
FIG. 2 is a rear end view of the dual loading stock trailer.

The upper section 60 and lower section 70 may also be pivotally connected by a hinged connector between the lower edge 64 of the upper section 60 and an upper edge of the lower section 70, not shown. The only essential features that the ramp 50 would be required to include would be that the length be such that it can be contained within the recessed floor 32 in the collapsed and the extended positions and elevated to provide an angled access between the principle trailer deck floor 110 and the recessed floor 32, the ramp 50 having sufficient strength to hold the weight of livestock during the loading and unloading of the trailer. It is also contemplated that the ramp 50 may be pivotally attached to the recessed floor 32 at the lower section 70 of the ramp 50 with the lift means 90 raising and lowering the upper section 60 or other embodiment providing a transitional platform. It should also be noted that any pinch point where the collapsible ramp 50 is pivotally connected, be avoided to prevent an animal or stockman from being injured while loading or unloading the animals or livestock whether the collapsible ramp 50 is in motion or stationary. In this regard, guards and shield may be employed at various locations to alleviate any potential for injury As indicated in FIG. 1, both the first and second loading areas 20, 30 are provided with an respective independent door 27, 37 to close each loading area, the vertical sliding doors shown in phantom line, or with swinging doors, not shown. Additionally, it is strongly encouraged that the first loading area 20 and the second loading area 30 be segregated by a stock panel partition 160 to prevent livestock loading in the first loading area 20 from falling or encroaching laterally into the second loading area 30.

Additional livestock panels, gates or partitions may also be provided for marshaling livestock within the livestock trailer to and from certain areas within the livestock trailer, as may be provided in existing livestock trailers, including interior deck floor and loading area gate panels. Also anticipated in conjunction with the above disclosed dual loading stock trailer, and as a replacement for the stock panel partition 160, it is contemplated that a combination partition and floor panel may be employed with a central vertical rotating mechanism providing a gate separating the first and second loading areas 20, 30 when in a vertical position or lying securely flat over the second loading area 30 parallel to the recessed floor 32 in the second loading area when in a horizontal position to prevent access to the second loading area 30 during loading and unloading in the first loading area 20 and also to prevent the stockman from falling into the recessed floor 32 of the second loading area. The gate may be provided in pivotal sections to block off the recessed floor 32 not only laterally and between the first and second loading areas 20, 30, but also in front of the recessed floor 32 to prevent access from both the front and side of the second loading area 30, isolating the "jail area" from the remainder of the livestock trailer 100. When deployed in the horizontal position, more space and carrying capacity is provided to the deck floor.

In furtherance of this objective, the central vertical rotating mechanism, defining the rotating arm, gate and rotating means, provides the rotating arm extending in a longitudinal direction at the rear end of the trailer, is located between the first and second loading areas 20, 30 along the deck floor 110, with the gate attached along a margin of the rotating arm. A locking extension is also provided on a margin opposite the gate. The rotating arm is rotatable to ninety degrees, with the attached panels in a vertical position, or with the attached panel in a horizontal position. This locking extension is secured in the vertical position against the second loading area 30 or some location which would prevent rotation beyond a vertical position. Additionally, under the loading floor 22 of the first loading area 20 is a locking extension aperture, which engages the locking extension as the rotating member and attached gate are in the horizontal position. To assist in support of the panel in the horizontal position, a panel support member may be attached within the second loading area 30, to support an upper margin of the gate, providing the panel to serve as a floor over the second loading area 30, bearing cargo or allowing livestock or animals to stand on the gate, with the panel being of sufficient strength to support livestock. The rotating means, again, may be provided as a mechanical means, an air driven means or an electrical means, having sufficient strength to raise and lower the gate between the vertical and horizontal positions. The panel may also be provided with some type of perforations which would not weaken the panel, but would provide for a flow of liquids which would be present by the livestock urination or weather penetration, and also allow for a person to see between the first and second loading areas 20, 30. This combination partition and floor panel is anticipated and may likely be the subject of further patentable subject matter filed by the inventor under separate filing and further disclosure and claimed subject matter Although the embodiments of the invention have been described and shown above, it will be appreciated by those skilled in the art that numerous modifications may be made therein without departing from the scope of the invention as herein described.

I claim:

1. An improved livestock trailers, said livestock trailer utilized for transporting of livestock or other animals by a semi-tractor or truck and defining a deck floor, sides, a front end, a rear end and a roof, said improved livestock trailer further comprising:

a first loading area within said rear end of said livestock trailer having a loading floor level with or near level with said deck floor of said livestock trailer and positioned at a height near that of a conventional fixed loading dock at a stockyard or corral, for unloading livestock at loading dock level;

a second loading area laterally adjacent to said first loading area at said rear end of said livestock trailer, said second loading area having a recessed floor positioned to load or unload livestock or animals directly to or from the ground behind said livestock trailer; and a collapsible ramp within said recessed floor of said second loading area, said ramp defining a lifting means, extended from a collapsed position to an extended position, wherein said extended position is utilized during livestock loading and unloading operations providing a rigid transitional platform between said deck floor of said trailer and said recessed floor of said second loading area, and wherein said collapsed position of said ramp utilized during transport providing said second loading area as an additional livestock pen or an equipment and feed storage area.

2. The improved livestock trailer as disclosed in claim 1, wherein said first loading area and said second loading area are segregated from one another by a stock panel partition.

3. The improved livestock trailer, as disclosed in claim 1, said livestock trailer further comprising:

said second loading area defining said recessed floor, a front vertical panel extending from said recessed floor to a presenting edge of said deck floor, two vertical side panels and a doorway having a sliding door or gate closure;

said collapsible ramp having an upper section defining an upper edge, a lower edge, a lower surface and having attached upper section side support rails, said upper section side support rails pivotally attached to said front vertical panel at an upper margin of said front vertical panel, a lower section defining a lower edge containing at least one roller or skid which roll or slide across said recessed floor, said lower section having attached lower section side support rails which are pivotally attached to said upper section side support rails, wherein said upper and lower sections are pivotally attached to form said collapsible ramp;

a secondary support brace assembly defining a pair of first brace sections pivotally attached to said front vertical panel below said upper edge of said upper section of said collapsible ramp, and a pair of second brace sections pivotally attached between said first brace sections and said lower edge of said upper section of said collapsible ramp to said lower surface of said upper section; and said lifting means attached between a base lifting means support attached to said second brace section and a cap lifting means support attached to said lower surface of said upper section of said collapsible ramp, wherein said lifting means creates a force urging said base lifting means support away from said upper section of said collapsible ramp, extending said collapsible ramp for said upper and lower sections to form a transitional platform between said deck floor to said recessed floor with sufficient strength to hold the weight of livestock during the loading and unloading process, said lifting means further collapsed or retracted to position said upper section vertically between said deck floor and said recessed floor said lower section against said recessed floor.

4. The improved livestock trailer, as disclosed in claim 1, wherein said lifting means is an airbag which derives power from existing power and air supply on said livestock trailer or towing vehicle.

5. The improved livestock trailer, as disclosed in claim 1, wherein said collapsible ramp defines an upper edge of an upper section pivotally attached to a lower section, said upper edge further attached by at least one hinge to a presenting margin of said deck floor adjacent to said second loading area providing access to said lifting means for maintenance and repair.

6. The improved livestock trailer, as disclosed in claim 1, wherein said collapsible ramp can withstand the weight of a live animal upon said collapsible ramp during the action of collapsing and extending said collapsible ramp and said lifting means provides sufficient lifting capacity to extend said collapsible ramp during extension and wherein said collapsible ramp is contained within said second loading area during extension and while providing a solid transitional platform between said deck floor and said recessed floor of said second loading area.

7. The improved livestock trailer, as disclosed in claim 1, wherein said second loading area defines a recessed floor, side panels, a doorway and said collapsible ramp supports a load in said second loading area, whether said load includes livestock, animals, feed, tack equipment or other transported materials, whether said collapsible ramp is in an extended or retracted position and regardless of whether said livestock trailer is stationary or in transit.

8. The improved livestock trailer, as disclosed in claim 1, wherein said collapsible ramp is integrated into said recessed floor and extendable as a transitional platform between said deck floor and said recessed floor.

9. The improved livestock trailer, as disclosed in claim 1, wherein said collapsible ramp is integrated as a vertical retaining wall between said deck floor and said recessed floor and extendable as a transitional platform between said deck floor and said recessed floor.

10. The improved livestock trailer, as disclosed in claim 1, wherein said collapsible ramp is integrated into said recessed floor, integrated as a vertical retaining wall between said deck floor and said recessed floor and is extendable as a transitional platform between said deck floor and said recessed floor.

11. The improved livestock trailer, as disclosed in claim 1, wherein said collapsible ramp is integrated into said recessed floor, integrated as a vertical retaining wall between said deck floor and said recessed floor and is extendable as a transitional platform between said deck floor and said recessed floor and wherein said collapsible ramp supports a load in said second loading area, whether said load includes livestock, animals, feed, tack equipment or other transported materials, whether said collapsible ramp is in an extended or retracted position and regardless of whether said livestock trailer is stationary or in transit.

12. The improved livestock trailer as disclosed in claim 1, wherein said first loading area and said second loading area are segregated from one another by a combination partition and floor panel having a central vertical rotating mechanism providing a partition separating said first and second loading areas when in a vertical position or when rotated into a horizontal position, lies flat over said second loading area, parallel to said recessed floor in said second loading area, preventing access to said second loading area during the act of loading and unloading livestock and animals in the first loading area and also to prevent a person from accidentally falling into said recessed floor of said second loading area.

\* \* \* \* \*